(12) United States Patent
Kim et al.

(10) Patent No.: US 10,841,464 B2
(45) Date of Patent: Nov. 17, 2020

(54) METHOD OF MANUFACTURING CAMERA MODULE

(71) Applicant: SAMSUNG ELECTRO-MECHANICS CO., LTD., Suwon-si (KR)

(72) Inventors: Gyu Won Kim, Suwon-si (KR); Kyoung Joong Min, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/429,542

(22) Filed: Jun. 3, 2019

(65) Prior Publication Data

US 2020/0120238 A1 Apr. 16, 2020

(30) Foreign Application Priority Data

Oct. 15, 2018 (KR) .......................... 10-2018-0122622

(51) Int. Cl.
*H04N 5/225* (2006.01)
*G03B 17/02* (2006.01)
*H04M 1/02* (2006.01)
*H04N 5/232* (2006.01)

(52) U.S. Cl.
CPC .......... *H04N 5/2252* (2013.01); *G03B 17/02* (2013.01); *H04M 1/0264* (2013.01); *H04N 5/23264* (2013.01)

(58) Field of Classification Search
CPC .. H04N 5/2252; H04N 5/23264; G03B 17/02; H04M 1/0264
See application file for complete search history.

(56) References Cited

U.S. PATENT DOCUMENTS

| | | | |
|---|---|---|---|
| 8,189,093 B2 * | 5/2012 | Tanimura | F03G 7/065 310/307 |
| 8,570,384 B2 | 10/2013 | Brown | |
| 9,137,429 B2 * | 9/2015 | Topliss | G02B 27/646 |
| 10,444,598 B1 * | 10/2019 | Heo | H04N 5/2253 |
| 2007/0279497 A1 * | 12/2007 | Wada | G03B 5/00 348/208.7 |
| 2007/0280668 A1 * | 12/2007 | Kubo | G02B 7/04 396/133 |
| 2012/0050896 A1 | 3/2012 | Nobe et al. | |

(Continued)

FOREIGN PATENT DOCUMENTS

| | | |
|---|---|---|
| KR | 10-2009-0081855 A | 7/2009 |
| KR | 10-2012-0022657 A | 3/2012 |
| KR | 10-2015-0013555 A | 2/2015 |

*Primary Examiner* — Timothy J Henn
(74) *Attorney, Agent, or Firm* — NSIP Law

(57) ABSTRACT

A method of manufacturing a camera module that includes a housing having an inner space, a frame disposed in the inner space of the housing and configured to accommodate a lens barrel therein, and optical image stabilization driving wires including driving wires driving the frame in a direction perpendicular to an optical axis. The method includes fixing both end portions of a target driving wire, among the driving wires, to a first inner side surface of the housing, disposing the frame adjacent a second inner side surface of the housing that opposes the first inner side surface, and coupling a center part of the target driving wire to a mounting member of the frame that faces the first inner side surface of the housing.

18 Claims, 11 Drawing Sheets

(56) References Cited

U.S. PATENT DOCUMENTS

| | | | |
|---|---|---|---|
| 2013/0002894 A1* | 1/2013 | Lee | H04N 5/2252 348/208.99 |
| 2014/0055630 A1* | 2/2014 | Gregory | G03B 3/02 348/208.2 |
| 2014/0139729 A1* | 5/2014 | Chen | G03B 3/10 348/373 |
| 2015/0135703 A1 | 5/2015 | Eddington et al. | |
| 2019/0320098 A1* | 10/2019 | Kang | G02B 7/023 |

* cited by examiner

METHOD OF MANUFACTURING CAMERA MODULE

CROSS-REFERENCE TO RELATED APPLICATIONS

This application claims the benefit under 35 USC 119(a) of Korean Patent Application No. 10-2018-0122622 filed on Oct. 15, 2018 in the Korean Intellectual Property Office, the entire disclosure of which is incorporated herein by reference for all purposes.

BACKGROUND

1. Field

The following description relates to a method of manufacturing a camera module.

2. Description of Background

For some time, a camera module has been a standard feature in portable electronic devices such as a smartphone, a tablet computer, or a laptop computer, and in accordance with this trend, a camera module for mobile terminals has generally been implemented with the capability to enable autofocusing (AF), optical image stabilization (OIS), and optical zoom functions.

As a camera module has become more complicated in structure and has increased in size in order to implement various functions, however, sizes of portable electronic devices in which such a camera module is mounted have also increased.

As the market for smartphone camera modules grows, attempts have been made to reduce and integrate functions of a regular analog camera, such as AF and optical zoom functions, as well as an OIS driving method. In line with structural diversity accompanied therewith, there has been increasing demand for an OIS driving method different from existing OIS methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of manufacturing a camera module capable of maximizing a driving force produced by a driving wire upon contraction/expansion.

In another general aspect, a method of manufacturing a camera module that includes a housing having an inner space, a frame disposed in the inner space of the housing and accommodating a lens barrel, and an optical image stabilization (OIS) driving wire including a plurality of driving wires driving the frame in directions perpendicular to an optical axis. The method includes fixing both end portions of a target driving wire, among the driving wires, to a first inner side surface of the housing; disposing the frame adjacent a second inner side surface of the housing that opposes the first inner side surface; and coupling a center part of the target driving wire to a mounting member of the frame that faces the first inner side surface of the housing.

The target driving wire may be coupled to the mounting member of the frame in a relaxed state.

The both end portions of the target driving wire may be fixed at corners formed by the first inner side surface of the housing.

The frame may be disposed in a center of the housing in a direction perpendicular to a driving force produced by the target driving wire.

The method may include disposing both end portions of a second target driving wire, among the driving wires, on the second inner side surface of the housing.

The method may include disposing the frame adjacent the first inner side surface of the housing.

The method may include coupling a center part of the second target driving wire to a second mounting member of the frame that faces the second inner side surface of the housing.

The driving wires may include a first driving wire on the first inner side surface of the housing, a second driving wire facing the first driving wire, a third driving wire on a third inner side surface of the housing that is adjacent to the first inner side surface, and a fourth driving wire facing the third driving wire.

The housing may include fixing connectors extending upwardly from corners of the housing, and each of the driving wires may be fixed to two adjacent fixing connectors.

Each of the driving wires may be formed of a shape memory alloy.

In another general aspect, a method of manufacturing a camera module which includes a housing having an inner space, a frame disposed in the inner space of the housing and accommodating a lens barrel, and an optical image stabilization (OIS) driving wire including driving wires driving the frame in a direction perpendicular to an optical axis. The method includes fixing both end portions of a target driving wire, among the driving wires, to an inner side surface of the housing; and coupling a center part of the target driving wire to a mounting member of the frame that faces the inner side surface of the housing. The center part of the target driving wire is coupled to the mounting member while an angle formed at the center part by both end portions of the target driving wire is minimized.

The target driving wire may be coupled to the mounting member of the frame in a relaxed state.

The both end portions of the target driving wire may be fixed at corners formed by the inner side surface of the housing.

The frame may be disposed in a center of the housing, in a direction perpendicular to a driving force produced by the target driving wire.

The housing may include fixing connectors extending upwardly from corners of the housing, and each of the driving wires may be connected to two adjacent fixing connectors.

Each of the driving wires may be formed of a shape memory alloy.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
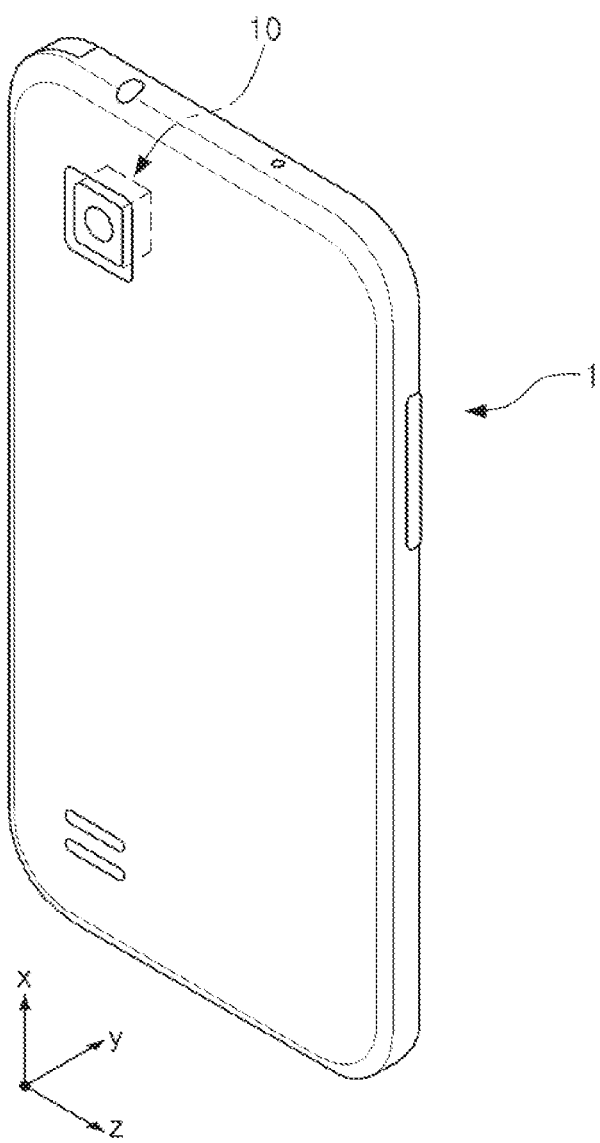
FIG. 1 is a perspective view of an example of an electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view of an example of an electronic device.

Referring to FIG. 1, an electronic device 1 may be a mobile electronic device, such as a portable communications terminal, a smartphone, or a tablet PC. The portable electronic device 1 includes a camera module 10 capable of capturing an image of a subject.

The camera module 10 is implemented with at least one of an autofocusing (AF) function and an optical image stabilization (OIS) function to provide an image signal of high resolution to the electronic device 1.

Figure 2:
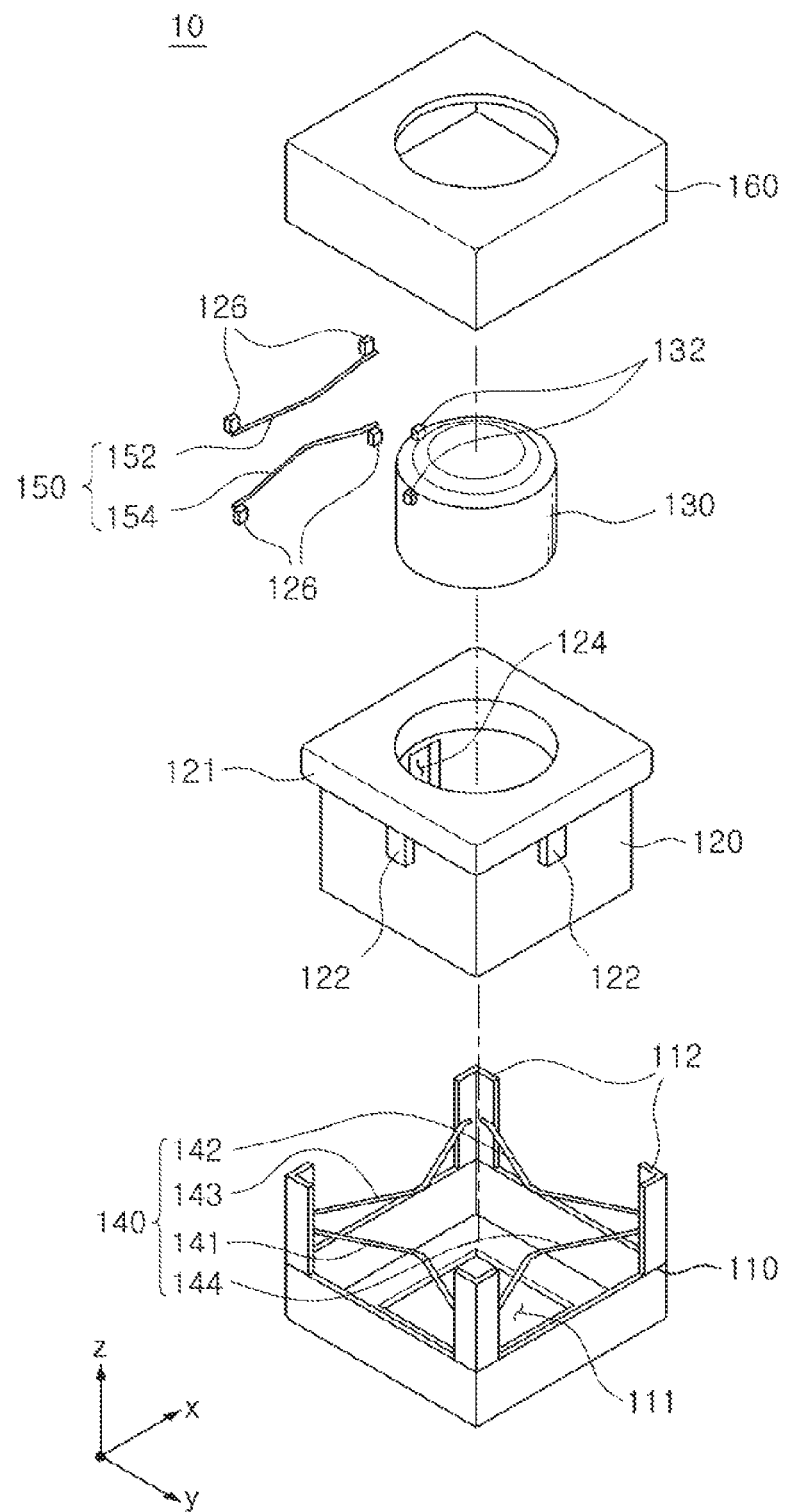
FIG. 2 is an exploded perspective view of a camera module according to an example.
Figure 3:
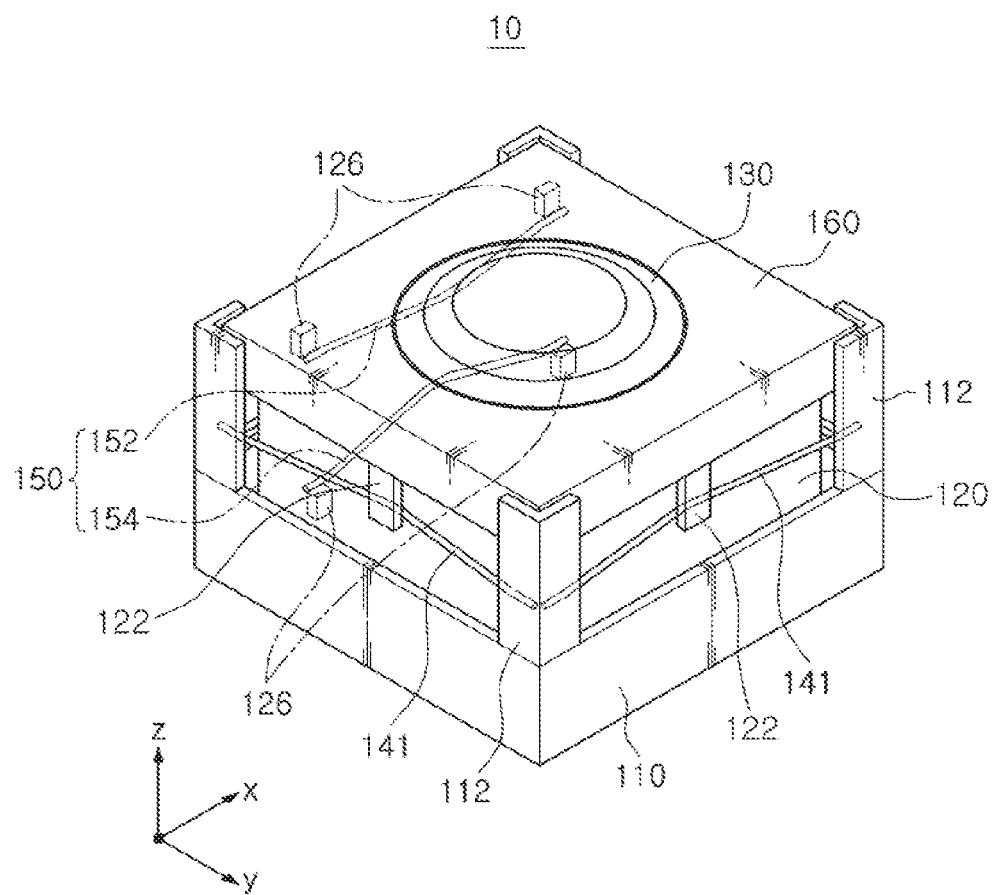
FIG. 3 is a perspective view of a camera module according to an example.
Figure 4:
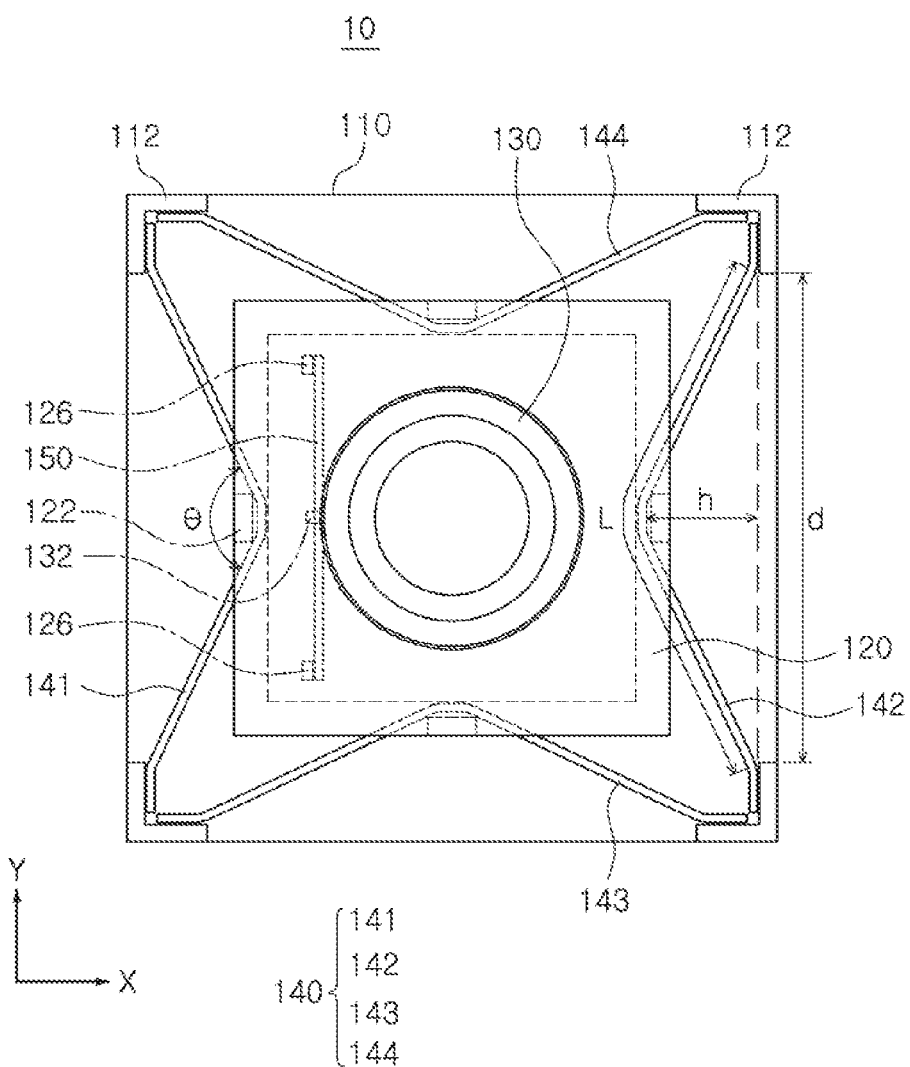
FIG. 4 is a top view of a main part of a camera module according to an example.
Figure 5:
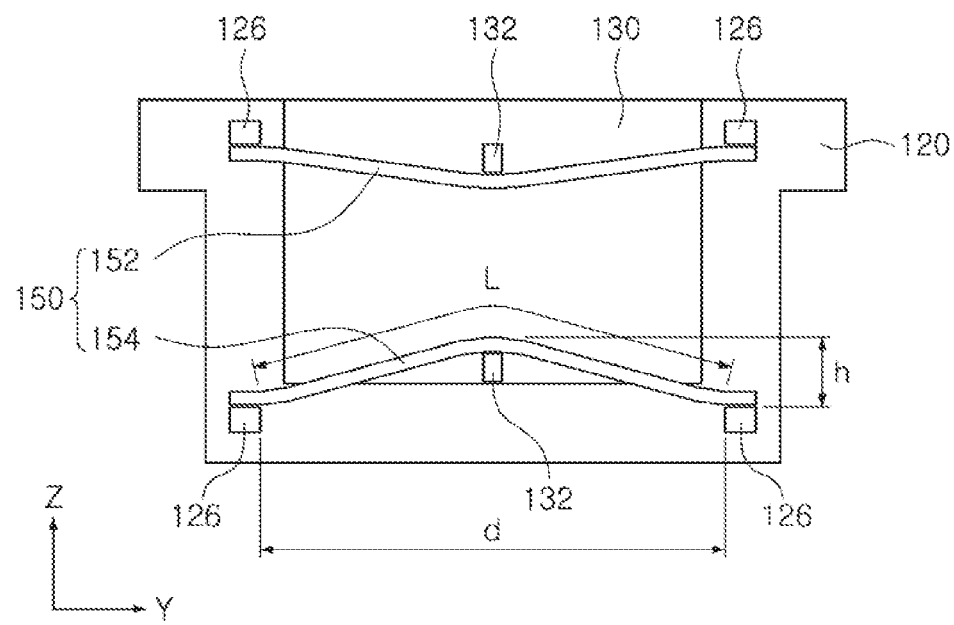
FIG. 5 is a cross-sectional view of a main part of a camera module according to an example.

FIG. 2 is an exploded perspective view of a camera module according to an example, FIG. 3 is a perspective view of a camera module according to an example, FIG. 4 is a top view of a main part of a camera module according to an example, and FIG. 5 is a cross-sectional view of a main part of a camera module according to an example.

Referring to FIG. 2 through FIG. 5, a camera module 10 includes a housing 110, a frame 120, a lens barrel 130, an OIS driving wire 140, an AF driving wire 150, and a case 160.

The housing 110 has a shape completely or partially housing the frame 120. For example, the housing 110 may be a substantially hexahedron in shape in which the top surface is open, wherein a through hole 111 for an image sensor is formed on a bottom surface of the housing 110. Corners of the housing 110 are provided with first fixing connectors 112 extending upwardly therefrom, and both end portions of the OIS driving wire 140 may be connected to the first fixing connectors 112.

The case 160 is configured to cover a portion of the housing 110. For example, the case 160 may be configured to cover the top surface and the four side surfaces of the housing 110. Alternatively, the case 160 may be configured to cover only the four side surfaces of the housing 110, or the case 160 may be configured to only partially cover the top surface and the four side surfaces of the housing 110. The case 160 may serve to shield electromagnetic waves generated by the camera module during operations. Electromagnetic waves are generated when operating the camera module, and such electromagnetic waves, when released externally, may influence other electronic components and cause communications errors or malfunctions. The case 160 may be formed of a metal material and grounded to a grounding pad of a substrate mounted below the housing 110 to shield electromagnetic waves so that the electromagnetic waves do not influence other electronic components.

The frame 120 is disposed inside the housing 110 and configured to be movable within the inner space of the housing 110. For example, the frame 120 is configured to move within the inner space of the housing 110 in the directions perpendicular to an optical axis (Z axis in FIG. 2), such as a first direction (an X axis direction) and a second direction (a Y axis direction). The frame 120 may be a substantially hexahedron in shape. Each of four external surfaces of the frame 120 is provided with a first mounting member 122 to which the OIS driving wire 140 is coupled. The first mounting member 122 may be disposed in a central part of each of the external surface of the frame 120. The first mounting member 122 may extend from a stepped portion 121 disposed on an upper end portion of the frame 120.

On inner surfaces of the frame 120, there may be formed an insertion recess 124 in which a second mounting member 132 of the lens barrel 130 is inserted and disposed. The insertion recess 124 provides space in which the second mounting member 132 of the lens barrel 130 can be disposed, when the lens barrel 130 is coupled to the frame 120.

A second fixing connector 126 for installation of the AF driving wire 150 may be provided on one inner side surface among four inner side surfaces of the frame 120. The second fixing connector 126 may be provided on a same inner side surface in which the insertion recess 124 is formed. A pair of second fixing connectors 126 may be provided on an upper end portion of the frame 120, and another pair of second fixing connectors 126 may be provided on a lower end portion of the frame 120.

The lens barrel 130 is installed in the frame 120 and configured to be movable in an optical axis direction (a Z axis direction) with respect to the frame 120. On one side of the lens barrel 130, a plurality of second mounting members 132 are disposed. Two of the second mounting members 132 may be spaced apart from each other in the optical axis direction (a Z axis direction). The second mounting member 132 is inserted and disposed in the insertion recess 124 of the frame 120.

The lens barrel 130 may be a hollow cylinder in shape, capable of accommodating therein at least one lens capturing an image of a subject, wherein the at least one lens is disposed in the lens barrel 130 along the optical axis. The at least one lens may include a plurality of lenses stacked one on top of the other in accord with a specific design of the lens barrel 130, wherein the plurality of lenses may have the same or different optical properties, such as refractive indices, from each other.

The OIS driving wire 140 may be formed of a shape memory alloy. Shape memory alloys are alloys with the shape memory effect, which are formed in their original phase, and even after being deformed to another phase through applications of an external stimuli, e.g., heat, can restore their original shape when returned to their original phase. Therefore, due to heat generated by an electric current, the OIS driving wire 140 may experience deformations through contraction and expansion. The OIS driving wire 140 may be a component of an actuator which will be described later.

The OIS driving wire 140 includes a first OIS driving wire 141 and a second OIS driving wire 142 for moving the frame 120 in the first direction (an X axis direction), perpendicular to the optical axis, and further includes a third OIS driving wire 143 and a fourth OIS driving wire 144 for moving the frame 120 in the second direction (a Y axis direction), perpendicular to the optical axis.

The first OIS driving wire 141 and the second OIS driving wire 142 may be coupled to first mounting members 122 on external side surfaces of the frame 120 to face each other, and the third OIS driving wire 143 and the fourth OIS driving wire 144 may be coupled to first mounting members 122 on external side surfaces of the frame 120 to face each other.

Each of the first OIS driving wire 141, the second OIS driving wire 142, the third OIS driving wire 143, and the fourth OIS driving wire 144 has both end portions installed at the first fixing connectors 112 extending from adjacent corners of the housing 110, and has a center part coupled to the first mounting member 122 of the frame 120. The OIS driving wire 140 is installed in the housing 110 and the frame 120 so as to form a substantially V shape.

When a fixed amount of an electric current is provided to the first OIS driving wire 141 and the second OIS driving wire 142 for moving the frame 120 in an X axis direction, and to the third OIS driving wire 143 and the fourth OIS driving wire 144 for moving the frame 120 in a Y axis direction, a center of the frame 120 and a center of the housing 110 may coincide with each other.

When the first OIS driving wire 141 is contracted by increasing an electric current provided to the first OIS driving wire 141, and the second OIS driving wire 142 is relaxed by decreasing an electric current provided to the second OIS driving wire 142, the center of the frame 120 is moved left (with respect to the view in FIG. 4) from the center of the housing 110. Alternatively, when the first OIS driving wire 141 is relaxed by decreasing an electric current provided to the first OIS driving wire 141, and the second OIS driving wire 142 is contracted by increasing an electric current provided to the second OIS driving wire 142, the center of the frame 120 is moved right (with respect to the view in FIG. 4) from the center of the housing 110.

Meanwhile, the frame 120 can be moved in a Y axis direction by increasing or decreasing the amount of an electric current provided to the third OIS driving wire 143 or/and the fourth OIS driving wire 144 in the same scheme for contracting and relaxing the first OIS driving wire 141 and the second OIS driving wire 142.

The AF driving wire 150 may be formed of a shape memory alloy. The AF driving wire 150 is configured to move the lens barrel 130 in a Z axis direction. For example, the AF driving wire 150 may be disposed on one of four inner side surfaces of the frame 120. The AF driving wire 150 may include a first AF driving wire 152 and a second AF driving wire 154 disposed below the first AF driving wire 152.

The AF driving wire 150 has both end portions installed at the second fixing connectors 126 disposed on the inner side surfaces of the frame 120, and a center part of the AF driving wire 150 may be connected to the second mounting member 132 of the lens barrel 130. The AF driving wire 150 is installed in the frame 120 and the lens barrel 130 so as to form a substantially V shape.

When a fixed amount of an electric current is provided to the first AF driving wire 152 and the second AF driving wire 154, the lens barrel 130 is disposed at a base position. When the first AF driving wire 152 is contracted by increasing an electric current provided to the first AF driving wire 152, and the second AF driving wire 154 is relaxed by decreasing an electric current provided to the second AF driving wire 154, the lens barrel 130 is moved upwardly (with respect to the view in FIG. 2). Alternatively, when the first AF driving wire 152 is relaxed by decreasing an electric current provided to the first AF driving wire 152, and the second AF driving wire 154 is contracted by increasing an electric current provided to the second AF driving wire 154, the lens barrel 130 is moved downwardly (with respect to the view in FIG. 2).

Figure 6:
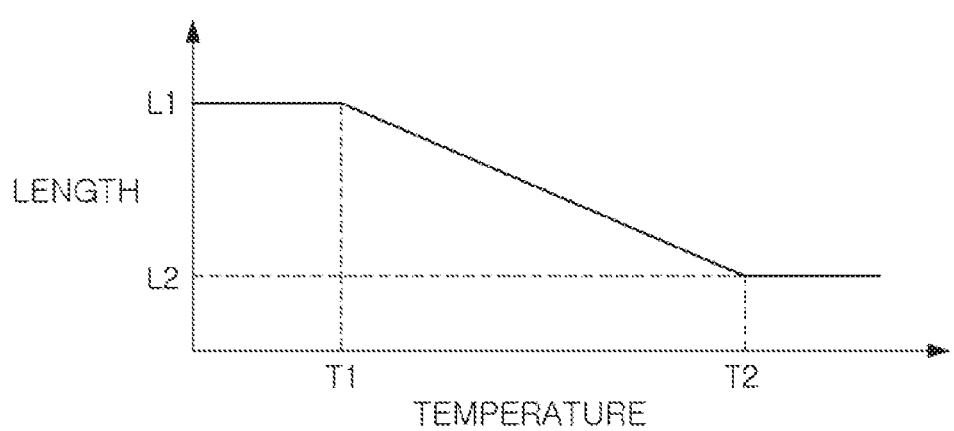
FIG. 6 is a length versus temperature graph for a shape memory alloy (SMA) wire according to an example.

FIG. 6 is a length versus temperature graph for a shape memory alloy (SMA) wire according to an example.

Referring to FIG. 6, the OIS driving wire 140, which is formed of a shape memory alloy, becomes shorter in length as the temperature increases. Also, unlike T1 in FIG. 5, T2 is greater than room temperature (25 C), and L1>L2 where L1 and L2 are lengths of the shape memory alloy (SMA) wire. Here, the L1 and the L2 satisfy Equation 1 below, where L1 and L2 are lengths of the SMA wire.

$$L2 = 0.978 \times L1 \quad \text{Equation 1:}$$

Referring back to FIG. 4, a distance between an inner side surface of the housing 110 and an inner side surface of a first mounting member 122 satisfies Equation 2 below where d is a distance between two adjacent first fixing connectors 112, L is a length of an OIS driving wire 140, and h is a distance between an inner side surface of the housing 110 and an inner side surface of a first mounting member 122.

$$h = \{(L/2)2 - (d/2)2\}^{\frac{1}{2}} \quad \text{Equation 2:}$$

For example, when the distance between the two adjacent first fixing connectors 112, d, is 8.8 mm, and the length of the OIS driving wire 140 at room temperature, L1, is 9.08 mm, and when the OIS driving wire 140 is in a most relaxed state, the distance h has a maximum value, wherein a maximum distance hmax is 1.12 mm. Also, when the OIS driving wire 140 is in a most contracted state, the distance h has a minimum value, wherein a minimum distance hmin is 0.6 mm. Therefore, through contraction and expansion of the OIS driving wire 140, the frame 120 can have a stroke (moving distance) of 0.52 mm at maximum in the X axis direction and the Y axis direction of FIG. 4.

Also, referring to FIG. 5, d is a distance between two adjacent second fixing connectors 126, L is a length of an AF driving wire 150, and h is a distance between a second fixing connector 126 and a second mounting member 132. When the distance between the two adjacent second fixing connectors 126, d, is 6.7 mm, and the length of the AF driving wire 150 at room temperature, L1, is 6.86 mm, the distance h has a maximum value, wherein a maximum distance hmax is 1.12 mm. Therefore, through contraction and expansion of the AF driving wire 150, the lens barrel 130 can have a stroke of 0.56 mm at maximum in the Z axis direction of FIG. 5.

According to an example, since OIS driving and AF driving are performed through the OIS driving wire 140 and the AF driving wire 150, the weight of the camera module 10 can be reduced, and by simplifying a manufacturing process thereof, the manufacturing costs of the camera module 10 can be reduced due to a reduced process time.

However, in order to enable the camera module 10 to perform AF function and OIS function, it is necessary that the OIS driving wire 140 and the AF driving wire 150 secure a sufficient driving force to drive the frame 120 and the lens barrel 130 within a maximum stroke range. However, if the OIS driving wire 140 is coupled to the housing 110 and the frame 120 when the frame 120 is positioned in the center of the housing 110, the frame 120 cannot be driven within the maximum stroke range.

Figure 7:
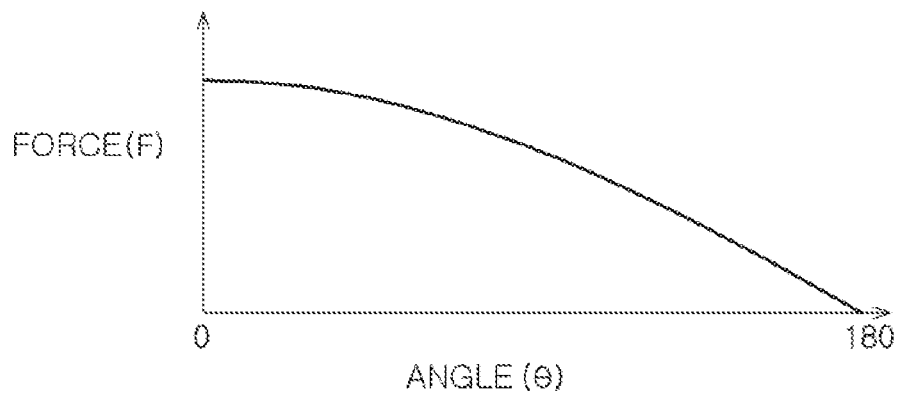
FIG. 7 is a graph between force F in a vertical direction produced by a driving wire upon expansion/contraction and contained angle θ of the driving wire, when coupled according to an example.

FIG. 7 is a graph between force F in a vertical direction produced by a driving wire upon expansion/contraction and contained angle θ of the driving wire, when coupled according to an example.

The driving wire is coupled to the frame 120 and the like, while the driving wire is in a most relaxed state. However, as can be seen in FIG. 7, as the contained angle θ of the driving wire increases, the force F produced by the driving wire in a vertical direction upon expansion/contraction decreases.

For example, referring back to FIG. 4, when coupling the first OIS driving wire 141 to the frame 120, the contained angle θ of the first OIS driving wire 141 is smaller when the frame 120 is disposed closer to a right side of the housing 110, compared to when the frame 120 is positioned at a neutral position or disposed closer to a left side of the housing 110. Therefore, the force F in a vertical direction, the direction in which the first OIS driving wire 141 relaxes—the (−) X axis direction of FIG. 4—can be increased.

Accordingly, to maximize a force produced by the OIS driving wire 140 upon expansion/contraction, it is necessary to control the position of the frame 120 depending on a target driving wire to be coupled thereto.

FIG. 8A, FIG. 8B, FIG. 8C, and FIG. 8D illustrate schemes for coupling an OIS driving wire according to examples. In FIG. 8A, FIG. 8B, FIG. 8C, FIG. 8D, and FIG. 8E, the first OIS driving wire 141, the second OIS driving wire 142, the third OIS driving wire 143, and the fourth OIS driving wire 144 are sequentially coupled in this order.

However, the coupling order may be varied within a range for maximizing forces produced by the first OIS driving wire 141, the second OIS driving wire 142, the third OIS driving wire 143, and the fourth OIS driving wire 144 upon expansion/contraction. For example, the coupling may be performed in the following order: the second OIS driving wire 142, the first OIS driving wire 141, the fourth OIS driving wire 144, and the third OIS driving wire 143.

In an example, the frame 120 and a target driving wire are coupled to each other while the frame 120 is disposed on a surface opposing an inner side surface on which the target driving wire is disposed. Here, when the target driving wire generates a driving force in one direction perpendicular to an optical axis, the frame 120 may remain disposed in the center of the housing 110, in the other direction perpendicular to the optical axis.

Figure 8A:
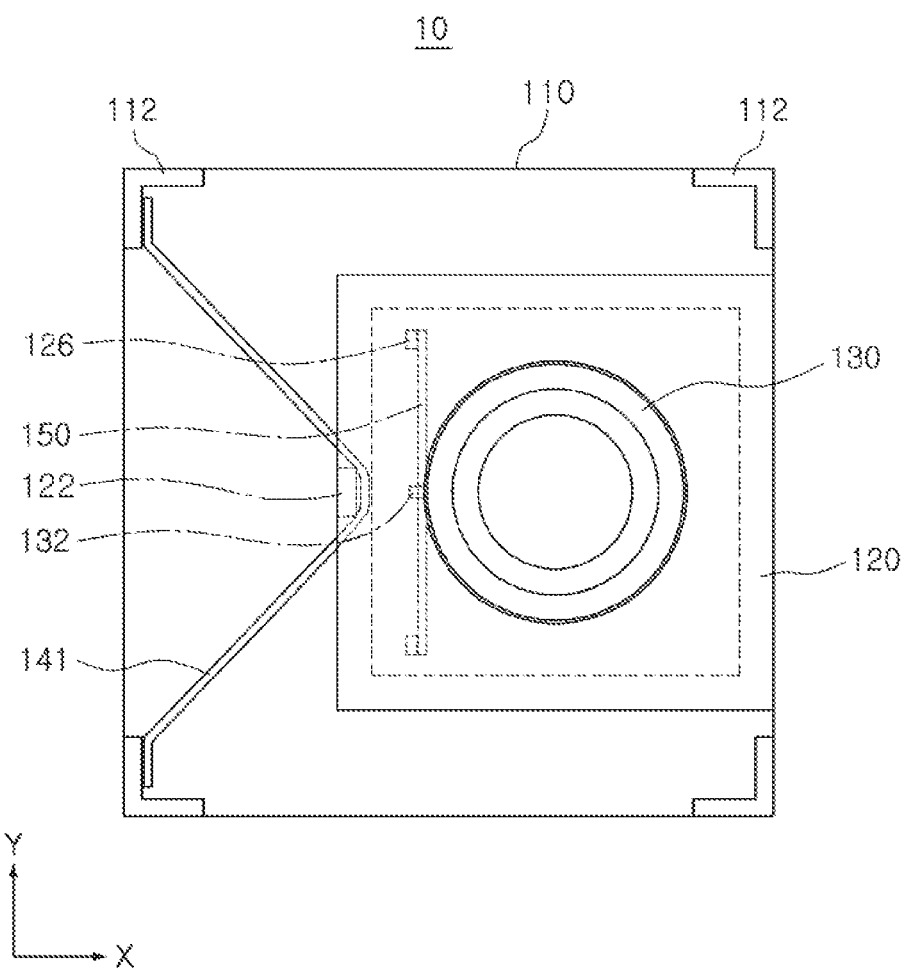
FIG. 8A, FIG. 8B, FIG. 8C, and FIG. 8D illustrate methods of coupling OIS driving wires according to an example.

FIG. 8A illustrates a method for coupling the first OIS driving wire 141, serving as a target driving wire, to the frame 120.

Referring to FIG. 8A, both end portions of the first OIS driving wire 141 are coupled at corners formed by a first inner surface of the housing 110. Also, a center part of the first OIS driving wire 141 is coupled to a first mounting member 122 facing the first inner surface of the housing 110 while the frame 120 is positioned in the center of the housing 110 in the Y axis direction of FIG. 8A and on (for example, adjacent to or in contact with) a second inner surface of the housing 110 in the X axis direction of FIG. 8A.

Figure 8B:
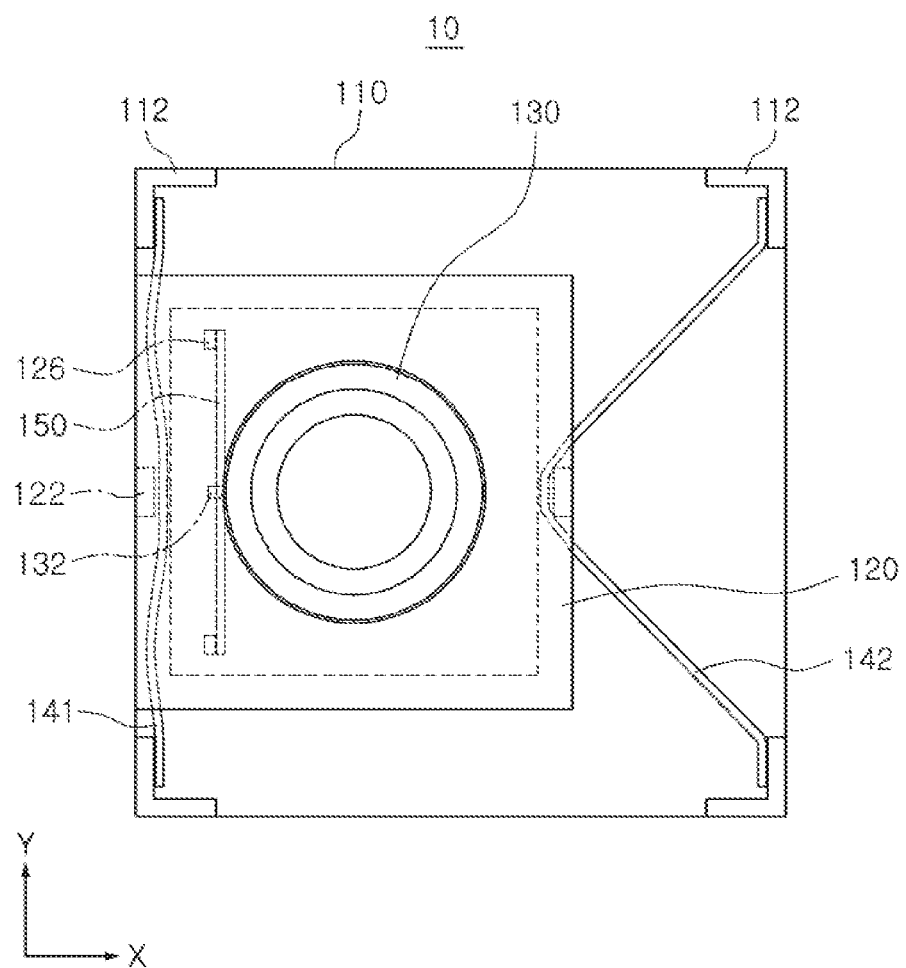

FIG. 8B illustrates a method for coupling the second OIS driving wire 142, serving as a target driving wire, to the frame 120.

Referring to FIG. 8B, both end portions of the second OIS driving wire 142 are coupled at corners formed by the second inner surface of the housing 110. Also, a center part of the second driving wire 142 is coupled to a first mounting member 122 facing the second inner surface of the housing 110 while the frame 120 is positioned in the center of the housing 110 in the Y axis direction of FIG. 8B and on (for example, adjacent to or in contact with) the first inner surface in the X axis direction of FIG. 8B.

Figure 8C:
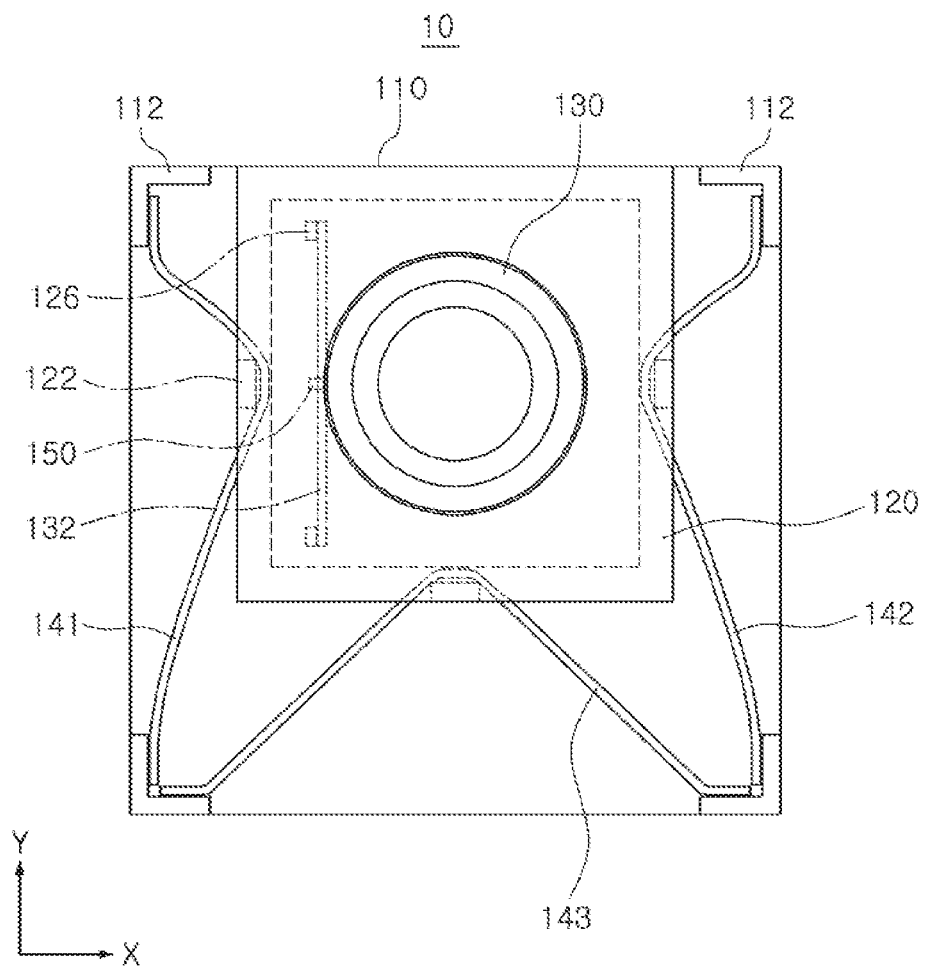

FIG. 8C illustrates a method for coupling the third OIS driving wire 143, serving as a target driving wire, to the frame 120.

Referring to FIG. 8C, both end portions of the third OIS driving wire 143 are coupled at corners formed by a third inner surface of the housing 110. Also, a center part of the third OIS driving wire 143 is coupled to a first mounting member 122 facing the third inner surface of the housing 110 while the frame 120 is positioned in the center of the housing 110 in the X axis direction of FIG. 8C and on (for example, adjacent to or in contact with) a fourth inner surface of the housing 110 in the Y axis direction of FIG. 8C.

Figure 8D:
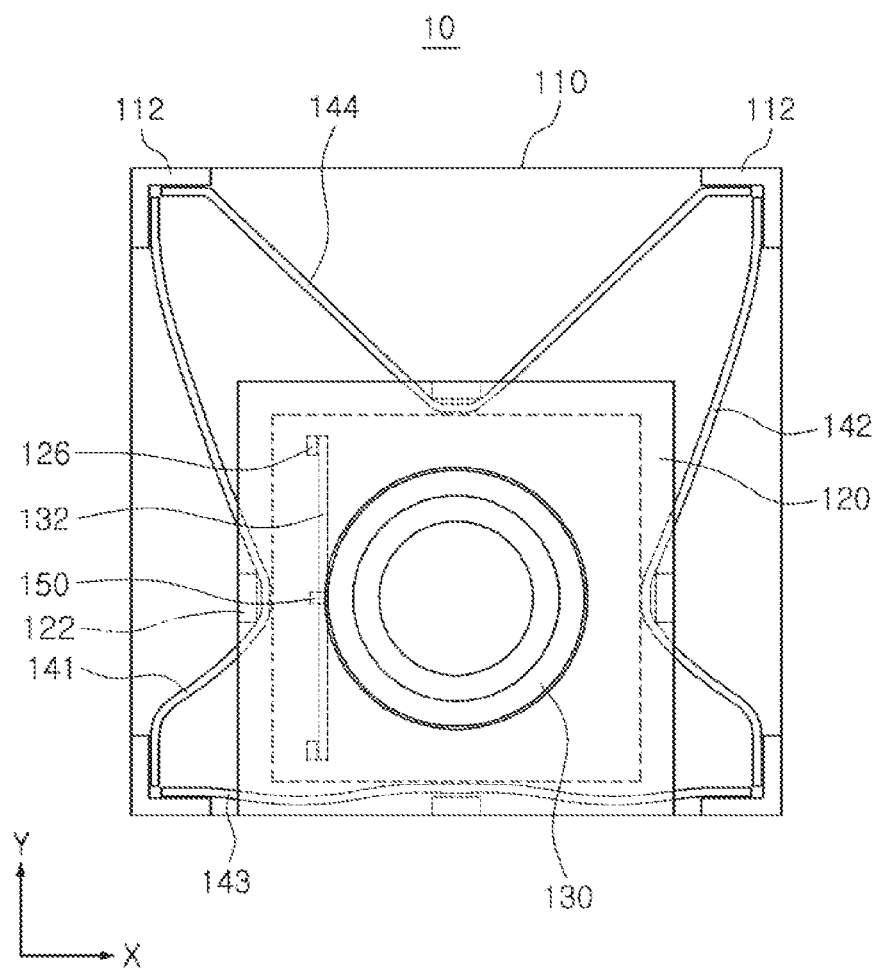

FIG. 8D illustrates a method for coupling the fourth OIS driving wire 144, serving as a target driving wire, to the frame 120.

Referring to FIG. 8D, both end portions of the fourth OIS driving wire 144 are coupled at corners formed by the fourth inner surface of the housing 110. Also, a center part of the fourth OIS driving wire 144 is coupled to a first mounting member 122 facing the fourth inner surface of the housing 110 while the frame 120 is positioned in the center of the housing 110 in the X axis direction of FIG. 8D and on (for example, adjacent to or in contact with) the third inner surface in the Y axis direction of FIG. 8D.

According to an example, by coupling the target driving wire to the frame 120 while the frame 120 is positioned on a surface opposing the inner surface on which the target driving wire is disposed, a driving force produced by the target driving wire to be coupled, upon expansion/contraction, can be maximized.

Figure 9:
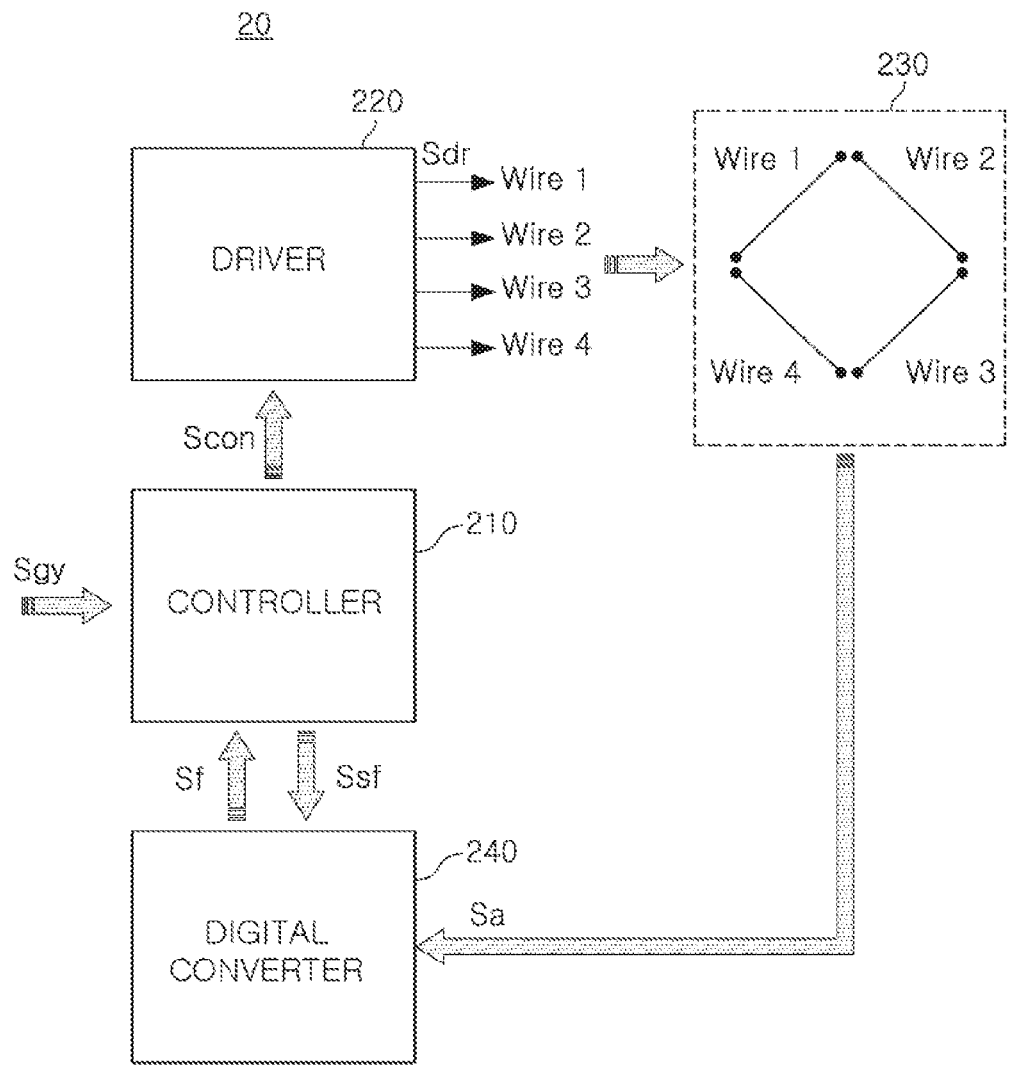
FIG. 9 is a block diagram of an actuator used in a camera module according to an example.
Figure 10:
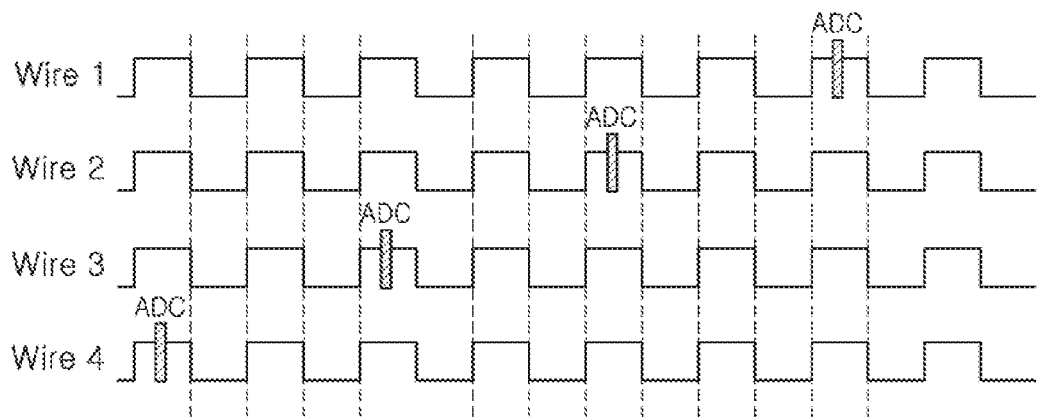
FIG. 10 illustrates an example of a driving signal according to an example.

FIG. 9 is a block diagram of an actuator used in a camera module according to an example, and FIG. 10 illustrates an example of a driving signal according to an example.

An actuator 20 in FIG. 9 includes the OIS driving wires of FIG. 2, and thus can perform an optical image stabilization function of the camera module.

In an example, the actuator 20 includes a controller 210, a driver 220, an OIS driving wire 230, and a digital converter 240. The controller 210, the driver 220, and the digital converter 240 may be included in a single driver integrated circuit (IC). The OIS driving wire 230 may include first to fourth driving wires Wire1 to Wire4, and the first to fourth driving wires Wire1 to Wire4 are components equivalent to the first OSI driving wire 141, the second OSI driving wire 142, the third OSI driving wire 143, and the fourth OSI driving wire 144 of FIG. 2.

The controller 210 can generate control signals Scon in response to gyro signals Sgy and feedback signals Sf input from an external source and can provide or output the generated control signals Scon to the driver 220.

The gyro signals Sgy can be provided from a gyro sensor included in the camera module or a mobile device. A target position of a lens barrel can be determined by the gyro signals Sgy. The gyro signals Sgy may be generated from a motion of the camera module or the mobile device sensed by the gyro sensor.

The control signals Scon may include channel information of the first to fourth driving wires Wire1 to Wire4 included in the OIS driving wire 230, and electric current information of the first to fourth driving wires Wire1 to Wire4 at the target position of the lens barrel.

The driver 220 generates driving signals Sdr based on control signals Scon provided or output from the controller 210 and provides or outputs the driving signals Sdr to the OIS driving wire 230. The driver 220 can modulate pulse widths of the driving signals Sdr provided or output to the first to fourth driving wires Wire1 to Wire4 based on the channel information and the electric current information of the control signals Scon. For example, the driver 220 may, by including a pulse width modulation PWM circuit, adjust the pulse widths of the driving signals Sdr based on the electric current information of the control signals Scon and drive the first to fourth driving wires Wire to Wire4. The pulse widths of the driving signals Sdr provided or output to the first to fourth driving wires Wire1 to Wire4 may be different from each other depending on the target position.

Referring to FIG. 10, the driver 220 can provide or output the driving signals Sdr to the first to fourth driving wires Wire1 to Wire4 simultaneously, in order to simultaneously drive the first to fourth driving wires Wire1 to Wire4. However, in some examples, the driver 220 may sequentially drive the first to fourth driving wires Wire1 to Wire4 for a predetermined time period.

The digital converter 240 converts analog signals Sa of the OIS driving wire 230 into digital signals to generate feedback signals Sf and provides the generated feedback signals Sf to the controller 210. The analog signals Sa of the OIS driving wire 230 may correspond to thermal resistances of the first to fourth driving wires Wire1 to Wire4. The digital converter 240 can measure thermal resistance of the OIS driving wire 230 and determine a present position of the lens barrel or the frame moving together with the lens barrel.

The digital converter 240 includes an analog to digital conversion circuit performing an analog to digital conversion, which converts the analog signals Sa into digital signals. The analog to digital conversion circuit may be operated in a sample and hold scheme to convert the analog signals Sa into digital signals.

In an example, the digital converter 240 includes one analog to digital conversion circuit in order to improve the efficiency of the system resources. As illustrated in FIG. 10, the one analog to digital conversion circuit may perform a digital conversion operation ADC to sequentially convert the analog signals Sa of the first to fourth driving wires Wire1 to Wire4 into digital signals.

The digital converter 240, upon completion of the digital conversion operation ADC, provides to the controller 210 an interrupt signal announcing the completion of the digital conversion operation ADC.

The digital converter 240 may perform a digital conversion operation based on a start flag signal Ssf provided or output from the controller 210. To determine a present position of the lens barrel precisely, the controller 210 may provide or output the start flag signal Ssf to the digital converter 240 so as to enable the digital converter 240 to perform a digital conversion operation in a time period during which a pulse of the driving signal Sdr is at high level.

Figure 11A:
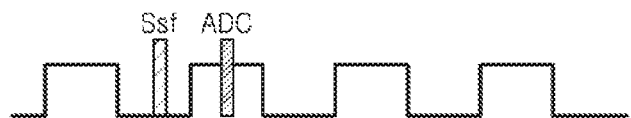
FIGS. 11A and 11B illustrate digital conversion operations according to various examples.
Figure 11B:
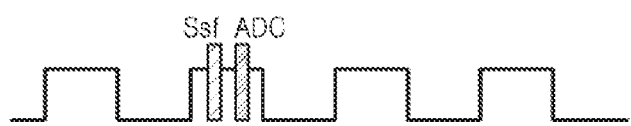

FIGS. 11A and 11B illustrate digital conversion operations according to various examples.

FIG. 11A illustrates a first digital conversion operation and a second digital conversion operation according to an example, and FIG. 11B illustrates a third digital conversion operation according to an example.

Referring to FIG. 11A and FIG. 11B, the digital conversion timing comes after a predetermined reference time from the output of a start flag signal Ssf. At the digital conversion timing, when the pulse of the driving signal Sdr is at high level, a digital conversion operation ADC can be performed.

Referring to FIG. 11A, once a target driving wire to be read is selected among a plurality of driving wires, and a target high-level pulse to be read is selected among a plurality of pulses, a start flag signal Ssf is provided or output based on the target driving wire and the target high-level pulse, and the first digital conversion operation may be performed within a pulse width of a high-level pulse output at a digital conversion timing that comes after a predetermined reference time from the output of the start flag signal Ssf.

The first digital conversion operation may be understood as a digital conversion operation performed in accordance with a start flag signal Ssf output based on a driving wire corresponding to a predetermined read target and a high-level pulse corresponding to a read target.

Still referring to FIG. 11A, the second digital conversion operation is similar to the first digital conversion operation but may be performed within a central region of the high-level pulse corresponding to the read target. To enable the second digital conversion operation to be performed in the central region of the high-level pulse corresponding to the read target, a half of a duty width of the high-level pulse corresponding to the read target is calculated, and a start flag signal Ssf is output based on the half of the duty width calculated.

Referring to FIG. 11B, a digital conversion timing is previously fixed, and then a start flag signal Ssf is periodically provided or output before the digital conversion timing. The third digital conversion operation ADC is performed after a predetermined reference time from the output of the start flag signal Ssf. However, the third digital conversion operation ADC may be performed, not every time a predetermined reference signal is output after the predetermined reference time from the output of a start flag signal Ssf, but only when a high-level pulse of a driving signal is output at the digital conversion timing.

Figure 12:
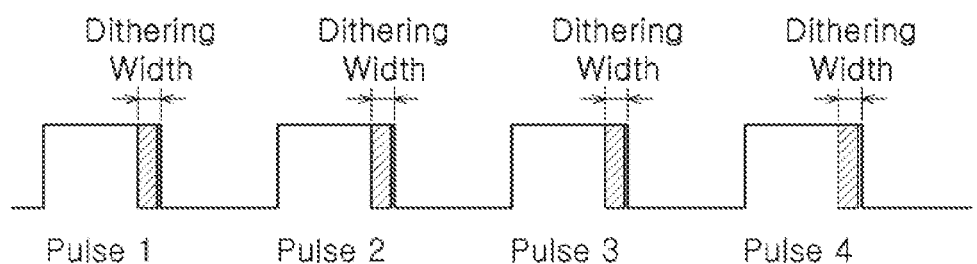
FIG. 12 illustrates a dithering scheme according to an example.

FIG. 12 illustrates a dithering scheme according to an example. In FIG. 12, the driving signal Sdr is illustrated as including a first high-level pulse Pulse 1 to a fourth high-level pulse Pulse 4 but is not limited thereto.

As described above, the driver 220 can adjust the pulse width of a high-level pulse of a driving signal Sdr output to one of the first to fourth driving wires Wire1 to Wire4, based on channel information and electric current information of a control signal Scon. Furthermore, the control signal Scon may further include dithering information, and based on the dithering information, the driver 220 can further adjust the pulse width of the high-level pulse of the driving signal Sdr and synchronize the digital conversion timing of the digital converter 240 with a period of the high-level pulse of the driving signal output to the driving wire.

More specifically, when the digital conversion timing of the digital converter 240 differs from the period of the high-level pulse of the driving signal output to the driving wire, the driver 220 can, based on the dithering information, synchronize the digital conversion timing with the period of the high-level pulse of the driving signal output to the driving wire.

The driver 220 can increase or decrease the pulse width of the high-level pulse of a driving signal by a dithering width based on the dithering information.

Referring to FIG. 12, the driver 220 may increase or decrease a pulse width of one of the first high-level pulse Pulse 1 to the fourth high-level pulse Pulse 4 by a dithering width based on dithering information. The driver 220 may increase the pulse width of one high-level pulse of two adjacent high-level pulses by a dithering width, while decreasing the pulse width of the other high-level pulse of the adjacent pair by the dithering width.

For example, when the pulse width of the first high-level pulse Pulse 1 is increased, the pulse width of the second high-level pulse Pulse 2 may be decreased. Furthermore, when the pulse width of the third high-level pulse Pulse 3 is increased, the pulse width of the second high-level pulse Pulse 2 or the pulse width of the fourth high-level pulse Pulse 4 may be decreased.

According to the examples, the pulse width of a driving signal can be flexibly adjusted by applying a dithering scheme to the driving signal. Accordingly, based on the driving signal to which the dithering scheme is applied, a digital conversion operation can be performed more precisely within a period of a high-level pulse of the driving signal Sdr, to accurately detect a present position of a lens barrel.

Figure 13:
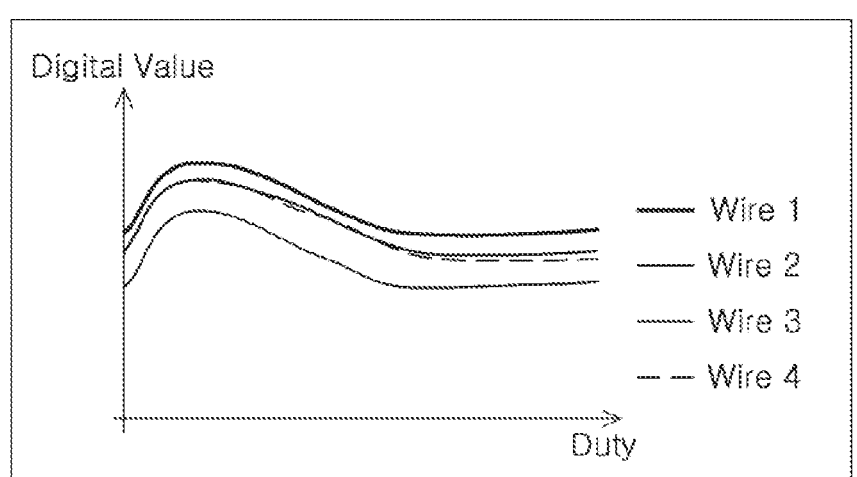
FIG. 13 illustrates graphs of digital values based on duties of driving signals according to an example.

FIG. 13 is a graph of digital values based on duty of a driving signal according to an example.

In an ideal case, when driving signals with an identical duty are provided or output to the first to fourth driving wires Wire1 to Wire4, digital values generated from thermal resistances of the first to fourth driving wires Wire1 to Wire4 are identical.

However, as can be seen in FIG. 13, even when driving signals with an identical duty are provided or output to the first to fourth driving wires Wire1 to Wire4, digital values generated from thermal resistances of the first to fourth driving wires Wire1 to Wire4 may be different from each other, and minimum duties and maximum duties, which correspond to maximum values and minimum values of the digital values, respectively, may be different from each other.

Characteristics variations in the first to fourth driving wires Wire1 to Wire4, such as different digital values, are generated due to manufacturing tolerances of the first to fourth driving wires Wire1 to Wire4. In particular, when the first to fourth driving wires Wire1 to Wire4 are coupled in the schemes illustrated in FIG. 8A and FIG. 8B, due to a load applied to each of the first to fourth driving wires Wire1 to Wire4, there may be greater characteristics variations among the first to fourth driving wires Wire1 to Wire4.

Therefore, to enable precise operations of the first to fourth driving wires Wire1 to Wire4, it is necessary that characteristics variations in the first to fourth driving wires Wire1 to Wire4 be corrected.

In an example, the controller 210 controls the driver 220 to apply driving signals, from a minimum duty to a maximum duty, to the first to fourth driving wires Wire1 to Wire4.

Once driving signals from zero duty to a full duty are applied to the first to fourth driving wires Wire1 to Wire4, a maximum digital value, a minimum duty corresponding to the maximum digital value, a minimum digital value, and a maximum duty corresponding to the minimum digital value are determined for each driving wire. As can be seen in FIG. 13, a minimum duty corresponds to a maximum digital value, and a maximum duty corresponds to a minimum digital value.

When there are multiple duties with a maximum digital value, the largest duty among the multiple duties can be determined as a minimum duty corresponding to the maximum digital value. Also, when there are multiple duties with a minimum digital value, the smallest duty among the multiple duties can be selected as a maximum duty corresponding to the minimum digital value.

Duty lengths of the first to fourth driving wires Wire1 to Wire4, Duty_Length_w1 to Duty_Length_w4 are determined by Equation 3 below.

$$\text{Duty\_Length\_}w1 = \text{Max\_Duty\_}w1 - \text{Min\_Duty\_}w1$$

$$\text{Duty\_Length\_}w2 = \text{Max\_Duty\_}w2 - \text{Min\_Duty\_}w2$$

$$\text{Duty\_Length\_}w3 = \text{Max\_Duty\_}w3 - \text{Min\_Duty\_}w3$$

$$\text{Duty\_Length\_}w4 = \text{Max\_Duty\_}w4 - \text{Min\_Duty\_}w4 \quad \text{Equation 3:}$$

According to Equation 3, a duty length of the first driving wire Wire1, Duty_Length_w1, is determined by a difference between a maximum duty of the first driving wire Wire1, Max_Duty_w1, and a minimum duty of the first driving wire Wire1, Min_Duty_w1; a duty length of the second driving wire Wire2, Duty_Length_w2, is determined by a difference between a maximum duty of the second driving wire Wire2, Max_Duty_w2, and a minimum duty of the second driving wire Wire2, Min_Duty_w2; a duty length of the third driving wire Wire3, Duty_Length_w3, is determined by a difference between a maximum duty of the third driving wire Wire3, Max_Duty_w3, and a minimum duty of the third driving wire Wire3, Min_Duty_w3; and a duty length of the fourth driving wire Wire4, Duty_Length_w4, is determined by a difference between a maximum duty of the fourth driving wire Wire4, Max_Duty_w4, and a minimum duty of the fourth driving wire Wire4, Min_Duty_w4.

Once the duty lengths of the first to fourth driving wires Wire1 to Wire4, Duty_Length_w1 to Duty_Length_w4 are generated, the smallest duty length thereof is determined as a minimum duty length Min_Duty_Length. By determining the smallest duty length as the minimum duty length Min_Duty_Length, duty lengths of the other wires can be normalized with respect to the driving wire having the smallest duty length.

Controllable maximum driving duties of the first to fourth driving wires Wire1 to Wire4, Max_Duty_drive_w1 to Max_Duty_drive_w4, are determined by Equation 4 below.

$$\text{Max\_Duty\_drive\_}w1 = \text{Min\_Duty\_}w1 + \text{Min\_Duty\_Length}$$

$$\text{Max\_Duty\_drive\_}w2 = \text{Min\_Duty\_}w2 + \text{Min\_Duty\_Length}$$

$$\text{Max\_Duty\_drive\_}w3 = \text{Min\_Duty\_}w3 + \text{Min\_Duty\_Length}$$

$$\text{Max\_Duty\_drive\_}w4 = \text{Min\_Duty\_}w4 + \text{Min\_Duty\_Length} \quad \text{Equation 4:}$$

Once a minimum duty length Min_Duty_Length is determined, a median value of the minimum duty length Min_Duty_Length, half_Min_Duty_Length, is generated. Once the median value of the minimum duty length, half_Min_Duty_Length, is generated, centers of the duty lengths Duty_Length, Duty_Length center, of the first to fourth driving wires Wire1 to Wire4 can be determined by Equation 5 below.

$$\text{Duty\_Length\_}w1\_\text{center} = \text{Min\_Duty\_}w1 + \text{half\_Min\_Duty\_Length}$$

$$\text{Duty\_Length\_}w2\_\text{center} = \text{Min\_Duty\_}w2 + \text{half\_Min\_Duty\_Length}$$

$$\text{Duty\_Length\_}w3\_\text{center} = \text{Min\_Duty\_}w3 + \text{half\_Min\_Duty\_Length}$$

$$\text{Duty\_Length\_}w4\_\text{center} = \text{Min\_Duty\_}w4 + \text{half\_Min\_Duty\_Length} \quad \text{Equation 5:}$$

The controller 210 can drive the first to fourth driving wires Wire1 to Wire4 more precisely by using information on the centers of the duty lengths of the first to fourth driving wires Wire1 to Wire4, Duty_Length_w1 center to Duty_Length_w4 center.

Further, as can be seen in Equation 6 below, differences in digital values of the first to fourth driving wires Wire1 to Wire4, Digital_value_diff_w1 to Digital_value_diff_w4, are determined by a difference between a maximum digital value and a minimum digital value of each driving wire.

$$\text{Digital\_value\_diff\_}w1 = \text{Max\_Digital\_value\_}w1 - \text{Min\_Digital\_value\_}w1$$

$$\text{Digital\_value\_diff\_}w2 = \text{Max\_Digital\_value\_}w2 - \text{Min\_Digital\_value\_}w2$$

$$\text{Digital\_value\_diff\_}w3 = \text{Max\_Digital\_value\_}w3 - \text{Min\_Digital\_value\_}w3$$

$$\text{Digital\_value\_diff\_}w4 = \text{Max\_Digital\_value\_}w4 - \text{Min\_Digital\_value\_}w4 \quad \text{Equation 6:}$$

Once the differences in digital values of the first to fourth driving wires Wire1 to Wire4, Digital_value_diff_w1 to Digital_value_diff_w4, are generated, slopes of digital values based on duties of the first to fourth driving wires Wire1 to Wire4, slope_w1 to slope_w4 are generated. The slopes of digital values based on duties of the first to fourth driving wires Wire1 to Wire4 are determined by Equation 7 below.

$$\text{slope\_}w1 = \text{Digital\_value\_diff\_}w1 / \text{Duty\_Length\_}w1$$

$$\text{slope\_}w2 = \text{Digital\_value\_diff\_}w2 / \text{Duty\_Length\_}w2$$

$$\text{slope\_}w3 = \text{Digital\_value\_diff\_}w3 / \text{Duty\_Length\_}w3$$

$$\text{slope\_}w4 = \text{Digital\_value\_diff\_}w4 / \text{Duty\_Length\_}w4 \quad \text{Equation 7:}$$

Once the slopes of digital values based on duties of the first to fourth driving wires Wire1 to Wire4 are generated, a slope of one driving wire among the first to fourth driving wires Wire1 to Wire4 is selected as a reference slope, and based on the selected slope, offsets of the other slopes are generated. As an example, the one driving wire having the reference slope may be the same as the driving wire having the smallest duty length.

Once the reference slope Reference_slope is determined, offsets are generated by Equation 8, as ratios of a slope of each of the first to fourth driving wires Wire1 to Wire4 to the reference slope Reference_slope, and correction coefficients are generated by the generated offsets. The controller 210 may apply the generated correction coefficients to driving signals to correct characteristics variations in the first to fourth driving wires Wire1 to Wire4.

$$\text{Offset}\_w1 = \text{slope}\_w1/\text{Reference\_slope}$$

$$\text{Offset}\_w2 = \text{slope}\_w2/\text{Reference\_slope}$$

$$\text{Offset}\_w3 = \text{slope}\_w3/\text{Reference\_slope}$$

$$\text{Offset}\_w4 = \text{slope}\_w4/\text{Reference\_slope} \quad \text{Equation 8:}$$

According to the examples, a method of manufacturing a camera module can maximize a driving force produced by a driving wire upon expansion/contraction.

The controller in FIG. 9, for example, that performs the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of manufacturing a camera module which includes a housing having an inner space, a frame disposed in the inner space of the housing and accommodating a lens barrel, and driving wires configured to drive the frame in a direction perpendicular to an optical axis, the method comprising:
    fixing end portions of a target driving wire, among the driving wires, to a first inner side surface of the housing;
    disposing the frame adjacent a second inner side surface of the housing that opposes the first inner side surface; and
    coupling an intermediate portion of the target driving wire to a mounting member of the frame that faces the first inner surface of the housing.

2. The method of claim 1, wherein the target driving wire is coupled to the mounting member of the frame in a relaxed state.

3. The method of claim 1, wherein the end portions of the target driving wire are fixed at corners formed by the first inner side surface of the housing.

4. The method of claim 1, wherein the frame is disposed in a center of the housing in a direction perpendicular to a driving force produced by the target driving wire.

5. The method of claim 1, further comprising:
    disposing end portions of another target driving wire, among the driving wires, on the second inner side surface of the housing.

6. The method of claim 5, further comprising:
    disposing the frame adjacent the first inner side surface of the housing.

7. The method of claim 6, further comprising:
    coupling an intermediate portion of the other target driving wire to a second mounting member of the frame that faces the second inner side surface of the housing.

8. The method of claim 1, wherein the driving wires include the driving wire, as a first driving wire, on the first inner side surface of the housing, a second driving wire facing the first driving wire, a third driving wire on a third inner side surface of the housing that is adjacent to the first inner side surface, and a fourth driving wire facing the third driving wire.

9. The method of claim 1, wherein the housing comprises fixing connectors extending upwardly from corners of the housing, and each of the driving wires is fixed to two adjacent fixing connectors.

10. The method of claim 1, wherein each of the driving wires is formed of a shape memory alloy.

11. The method of claim 1, wherein the intermediate portion is at a central part of the target driving wire.

12. A method of manufacturing a camera module which includes a housing having an inner space, a frame disposed in the inner space of the housing and accommodating a lens barrel, and an optical image stabilization (OIS) driving wire including driving wires driving the frame in a direction perpendicular to an optical axis, the method comprising:

fixing end portions of a target driving wire, among the driving wires, to an inner side surface of the housing; and coupling an intermediate portion of the target driving wire to a mounting member of the frame that faces the inner side surface of the housing, wherein the intermediate portion the target driving wire is coupled to the mounting member to have an angle formed at the intermediate portion, between end portions of the target driving wire, to be less than an angle formed at the intermediate portion by end portions when the target driving wire is substantially straight.

13. The method of claim 12, wherein the target driving wire is coupled to the mounting member of the frame in a relaxed state.

14. The method of claim 12, wherein the end portions of the target driving wire are fixed at corners formed by the inner side surface of the housing.

15. The method of claim 12, wherein the frame is disposed in a center of the housing, in a direction perpendicular to a driving force produced by the target driving wire.

16. The method of claim 12, wherein the housing comprises fixing connectors extending upwardly from corners of the housing, and each of the driving wires is connected to two adjacent fixing connectors.

17. The method of claim 12, wherein each of the driving wires is formed of a shape memory alloy.

18. The method of claim 12, wherein the intermediate portion is at a central part of the target driving wire.

* * * * *